United States Patent [19]

Nakagome et al.

[11] 4,422,718

[45] Dec. 27, 1983

[54] SUBMARINE OPTICAL FIBER CABLE

[75] Inventors: Yukio Nakagome; Kitsutaro Amano, both of Yokohama; Taiichiro Nakai, Fujisawa; Yasuhiko Niiro, Yokohama; Yoshihiro Ejiri, Tokyo; Hitoshi Yamamoto, Kawasaki; Yoshihiko Yamazaki, Kashiwa, all of Japan

[73] Assignee: Kokusai Denshin Denwa Kabushiki Kaisha, Tokyo, Japan

[21] Appl. No.: 317,842

[22] Filed: Nov. 3, 1981

Related U.S. Application Data

[63] Continuation of Ser. No. 20,872, Mar. 15, 1979, abandoned.

[30] Foreign Application Priority Data

Mar. 31, 1978 [JP] Japan ................................ 53-36580
Mar. 31, 1978 [JP] Japan ................................ 53-36581

[51] Int. Cl.³ .............................................. G02B 5/14
[52] U.S. Cl. ................................. 350/96.23; 174/70 R
[58] Field of Search ................. 350/96.23; 174/70 R, 174/70 S, 101, 102 R, 102 C, 97, 109

[56] References Cited

U.S. PATENT DOCUMENTS

| | | | |
|---|---|---|---|
| 597,790 | 1/1898 | Smith et al. | 174/70 R X |
| 2,000,355 | 5/1935 | Sichtermann | 174/97 X |
| 2,006,932 | 7/1935 | Rosch | 174/109 X |
| 3,766,307 | 10/1973 | Andrews, Jr. | 174/70 R X |
| 3,790,697 | 2/1974 | Buckingham | 174/109 X |
| 3,883,218 | 5/1975 | Slaughter | 350/96.23 |
| 4,118,594 | 10/1978 | Arnaud | 350/96.23 |
| 4,156,104 | 5/1979 | Mondello | 174/70 R |
| 4,359,598 | 11/1982 | Dey et al. | 350/96.23 X |

FOREIGN PATENT DOCUMENTS

| | | | |
|---|---|---|---|
| 2434280 | 2/1976 | Fed. Rep. of Germany | 350/96.23 |
| 2507648 | 9/1976 | Fed. Rep. of Germany | 350/96.23 |
| 2710098 | 9/1978 | Fed. Rep. of Germany | 350/96.23 |
| 2820510 | 11/1978 | Fed. Rep. of Germany | 174/70 R |
| 1470890 | 4/1977 | United Kingdom | 350/96.23 |

OTHER PUBLICATIONS

Wilkins, "Fiber Optic Cables for Undersea Communications," *Fiber and Integrated Optics*, vol. 1, No. 1, Jan. 1977, pp. 39–62.

*Primary Examiner*—John D. Lee
*Attorney, Agent, or Firm*—Robert E. Burns; Emmanuel J. Lobato

[57] ABSTRACT

A submarine optical fiber cable using a low-loss optical fiber as a transmission medium, which is provided with a cylindrical pressure resisting layer composed of an assembly of three equally divided long pressure resisting segments of fan-shaped sections with flat contact planes and having at least one optical fiber in an optical fiber housing space formed in the center of the assembly so as to protect the optical fiber from a high water pressure.

8 Claims, 27 Drawing Figures

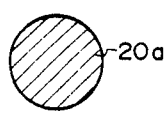   
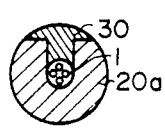  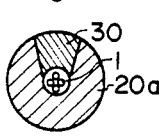 
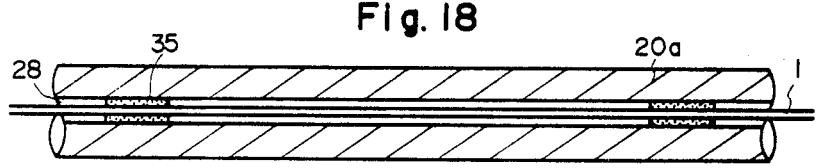
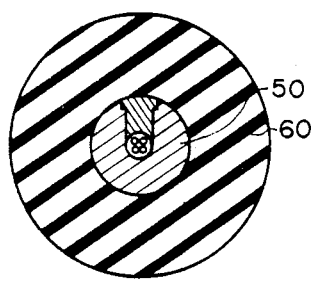 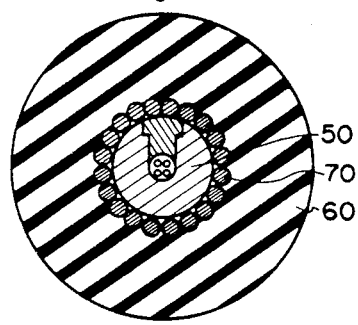
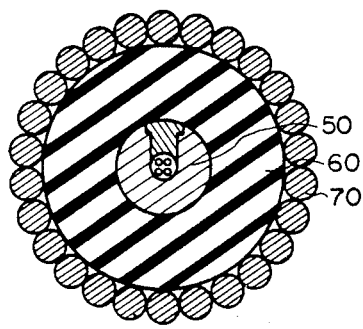

SUBMARINE OPTICAL FIBER CABLE

This is a continuation, of application Ser. No. 020,872, filed Mar. 15, 1979 and now abandoned.

BACKGROUND OF THE INVENTION

This invention relates to a cable structure suitable for a long haul submarine optical fiber cable in the field of optical communications employing optical fibers of low loss as a transmission medium.

Optical fibers have such features as a low loss, a wide transmission band, noninductivity and a light weight, and hence are very advantageous as a wide-band transmission medium. Therefore, an attempt has widely been made to achieve large capacity communications with a cable using the optical fibers, and some examples of application of the optical fibers to a submarine cable utilizing its wide transmission band and low loss properties have been reported. These properties are also very desirable for a submarine cable and it is expected that a submarine cable using the optical fibers will be carried into practice. However, since the submarine cable is laid in the surroundings entirely different from those in which a land cable is laid, the following matters must be taken into account in a case of using the optical fibers in the submarine cable.

(1) A cable structure for protecting the optical fibers from the influence of characteristic change due to a high hydraulic pressure and sea water.

(2) A mechanism for providing a tensile strength which is needed in the laying or repair of the cable.

(3) A sheath for protecting the optical cable against various external forces.

(4) A cable structure for power feeding to submerged repeaters.

Optical fiber submarine cables heretofore proposed adopt the construction in which the optical fiber is inserted into a pressure resisting pipe. The optical fiber is made of glass and its characteristics, as an optical transmission line, does not change when being subjected to an external pressure. However, the optical fiber is mechanically weak, so that nylon, polyethylene or like material is coated on the optical fiber to increase its mechanical strength against a tensile force and external forces. The optical fiber thus coated is called an optical fiber core. When the optical fiber core is subjected to an external force, nonuniformity of the coating in the lengthwise direction of the fiber and the adhesion between the fiber and the coating and, in a case of the coating being double or triple, nonuniformity of the adhesion between the coatings in the lengthwise direction of the fiber, cause a very slight bending of the optical fiber, resulting in an increased transmission loss. Therefore, in the laying of the optical fiber core on the seabed, it is necessary to take measures for protecting the optical fiber from the sea water pressure; there has been proposed to insert the optical fiber into a pressure resisting pipe. To further use the pipe as a power feeding conductor or a tension member for increasing the mechanical strength of the pipe against the water pressure and the economization of the cable, the thickness of the pipe must be increased. However, it has heretofore been difficult to continuously manufacture a long thick pipe while at the same time inserting thereinto the optical fiber core. Moreover, the manufacture of the pipe requires heating in the both cases of the extrusion method and the forming method using a roll former, so that if the adiabatic layer for protecting the optical fibers is insufficient, their transmission characteristics are adversely affected. Therefore, it is desirable to produce a thick pipe without involving any heating process. This is difficult with the conventional manufacturing method of pipe. Moreover, also in a case of considering the cable as a whole, the conventional structures are not suitable for a long-distance, deep-sea submarine cable from the economical point of view as well as in terms of handling during cable laying.

SUMMARY OF THE INVENTION

An object of invention is to provide a submarine optical fiber cable which overcomes such defects of the prior art and which is simple in construction and easy of continuous fabrication and employs a high-pressure resisting layer.

Another object of this invention is to provide an economical submarine optical fiber cable which employs a thick pressure resisting layer protecting optical fibers from an external pressure and easy to manufacture without involving any heating process for manufacturing a thick pressure resisting layer to simplify the cable structure and its fabrication.

Another object of this invention is to provide a submarine optical fiber cable, in which a dam for guarding against water is provided inside of the pressure resisting layer or a viscous liquid for preventing sea water from entering into the pressure resisting layer, thereby to guard against troubles.

BRIEF DESCRIPTION OF THE DRAWINGS

This invention will be hereinafter described in detail with reference to the accompanying drawings, in which:

FIGS. 10, 11, 12 and 13 are cross-sectional diagram explanatory of an embodiment of this invention;

FIGS. 14, 15, 16 and 17 are cross-sectional views explanatory of other embodiments of this invention;

FIG. 18 is a longitudinal sectional view explanatory of another embodiment of this invention; and FIGS. 19, 20 and 21 are cross-sectional view illustrating other embodiments of this invention.

DESCRIPTION OF THE PREFERRED EMBODIMENTS

To make differences between the prior art and this invention clear, some examples of the conventional art will first be described.

Figure 1A:
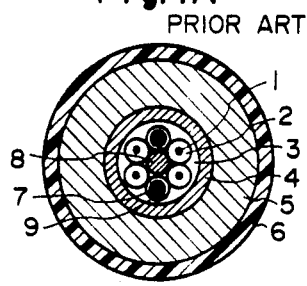
FIGS. 1A, 1B and 1C and FIG. 2 are cross-sectional views showing typical examples of conventional optical fiber submarine cables.
Figure 1B:
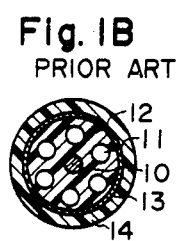
Figure 1C:
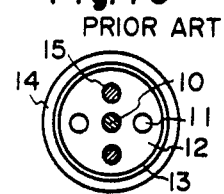

For example, Japanese Patent Disclosure No. 99032/76 entitled "Submarine Cable", adopts such a structure as shown in FIG. 1. FIG. 1A illustrates an example of a cable structure employing a pressure rsisting pipe which is characterized by a small diameter. Four optical fiber cores, each having a coating 2 around an optical fiber 1, and two power-feeding wires 7, each having an insulating layer 9, are assembled together around a tension member 8, and then they are covered with an adiabatic layer 3, by which heat generated during the formation of a pipe is prevented from transmission to the optical fibers. A pressure buffer layer 4 is encomposed around the adiabatic layer 3 to prevent a pressure from being applied locally to the optical fibers 1, and the pressure buffer layer 4 is protected with a pressure resisting pipe 5. Reference numeral 6 indicates a protective plastic jacket. FIG. 1B shows a cable comprising a plurality of such units of FIG. 1A. The cable has a tension member 10 incorporated centrally thereof and six pressure resisting pipes 11 disposed around the tension member 10, and they are fixed by a plastic material 12. The assembly is covered with a water-proof layer 13, which is, in turn, protected with a plastic coating 14. Where a feeder is disposed outside of a high pressure pipe in the unit of FIG. 1A, use is made of such a structure as shown in FIG. 1C, which is identical with that of FIG. 1B except feeders indicated by 15.

When such a cable is used as a long distance submarine cable, in a case of such a structure as shown in FIG. 1A or 1B having feeders incorporated in the pressure resisting pipe, it is necessary to increase the diameter of the pipe. The reason is as follows: For instance, assuming as a system a submarine cable between Japan and Hawaii, a feeding voltage necessary for the transmission of 12,000 telephone channels is as high as 16,500 Volts (at a line speed of 400 Mega-bits/second, two systems and the number of repeaters is 248) even in a case of making use of feeders having a relatively small resistance value of 0.5 $\Omega$/km if a voltage necessary for one repeater is assumed to be 32 Volts. Even if the power feedingwire is made of copper, it must be 6.64 mm thick, and if this power feeding wire is inserted in the pressure resisting pipe together with optical fibers, the pressure resisting pipe is required to have an inner diameter of a dozen or so millimeters and a thickness of about 5 mm for withstanding a water pressure at a sea depth of 800 meters (m). Thus the pipe cannot be a small-diameter pipe and accordingly, the feature of easy fabrication of the pipe because of its small diameter, as alleged in the prior application (which employs a method of forming the pipe by a roll former), is meaningless. In practice, it is very difficult to produce a thick pipe by the method set forth in the prior application. Therefore, the cable structure described above introduces great difficulties in putting to practical use a long distance submarine cable to be laid in deep seas.

Next, in such a structure as shown in FIG. 1C, the feeders are disposed outside of the pressure resisting pipe, so that the feeders need not be provided at the inside of the pipe. In this case, however, the optical fibers, the adiabatic layer and the pressure buffer layer must be disposed at the inside of the pipe. Since the adiabatic layer is provided to protect the optical fibers from the heat which is generated during the manufacture of the pipe, this layer is very important and must be given a sufficient adiabatic effect. Accordingly, when these layers are put in the pipe together with several optical fibers, it is difficult to make the pipe to have an inner diameter of 1 mm as described in the prior application and a large inner diameter is required, so that the pipe thickness becomes inevitably large, and also in this case, it is difficult to manufacture the pipe by the forming method.

Figure 2:
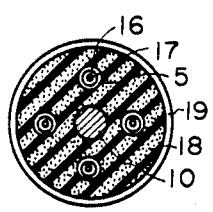
Figure 3A:
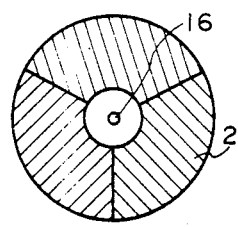
FIGS. 3A, 3B, 3C and 3D are cross-sectional views illustrating typical examples of pressure resisting layers produced according to this invention.
Figure 3B:
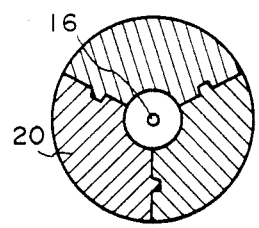
Figure 3C:
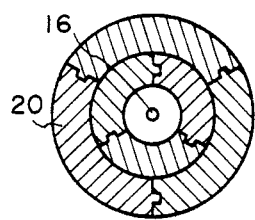
Figure 3D:
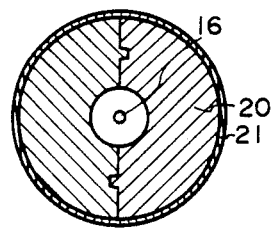

Considering the cable as a whole, the tension member as well as the power feeding wires become appreciably thick for laying the cable at a sea depth of 8000 m. Accordingly, in this structure, the thick power feeding wires and the thick tension member are disposed in alignment with each other, resulting in serious defects of an increased cable diameter and difficulty in bending the cable in the direction of alignment of the power feeding wires and the tension member. Further, since the optical fibers do not lie at the center of the cable, the loss of an extra length due to a spiral pitch is also present, so that this cable structure is not economical. Therefore, even the fabrication of the long distance submarine cable of this structure to be laid in deep seas is difficult, and this cable is not only uneconomical but also difficult to handle in the laying operation. Besides, Japanese Pat. Disc. No. 121342/76 sets forth such a structure of FIG. 2 entitled "Optical Fiber Cable". In FIG. 2, reference numeral 16 indicates an optical fiber core; 17 designates a space or a jellied substance; 5 identifies a pressure resisting pipe; 18 denotes a soft plastic or rubber; 10 represents a tension member; and 19 shows a cable covering. In this structure, when the power-feeding wires are also used as the pressure resisting pipes 5, the power-feeding wires become thick, as mentioned above, so that the pressure resisting pipe 5 become thick and are difficult to produce by the pipe manufacturing method disclosed in this second prior application (a pipe extrusion method or the same forming method as in the aforesaid "Submarine Cable"). The same is true of the structure in which the power-feeding wires are disposed in the pipe. In a case where power-feeding wires are placed outside of the pipe, the pipe structure becomes similar to that of FIG. 1C, so that when considering the cable as a whole, this structure is not suitable for a long-distance, deep-sea submarine cable for the same reasons as is the case with FIG. 1C.

As discussed above, in the conventional optical fiber submarine cables, the pressure resisting pipe is made small-diameter one for convenience of fabrication but, examining their structures from the viewpoint of the long-distance and deep-sea use, the pipe cannot be small in diameter in many cases.

Embodiments of this invention will hereinafter be described in detail.

FIG. 3 illustrates typical examples of the constructions of pressure resisting layers of this invention. FIG. 3A shows a pressure resisting layer which is an assembly of three equally divided long segments of a pressure resisting material. The number of segments in this case is three and is determined in dependence on characteristics of the cable and on ease of manufacture. With this structure, pressure resisting long segments 20 are fan-shaped in cross section having longitudinally extending flat planes in contact with each other and are continuously assembled together about an optical fiber core 16 to form a cylindrical pressure resisting layer. The pressure resisting long segments 20 are made of a material capable of withstanding a sea water pressure in a deep sea (for example, 800 atm, at a depth of 8000 m). In order to ensure that the individual long segments are placed in position relative to adjacent ones of them during assembling, it is also possible to form a groove and a projection in each of the long segments for engagement with those of the others, as shown in FIG. 3B. However, since the section of each segment 20 is fan-shaped in cross section in FIG. 3A the contact pressure between adjacent segments 20 is increased by the sea water hydrostatic pressure. Accordingly, the example of FIG. 3A is also easily manufactured. Further, it is also possible to make the pressure resisting layer thick by the employment of such a multi-layer structure as shown in FIG. 3C. For close contact of each segment with adjacent ones of them, their joints may be welded or fixed by means of an adhesive, but the segments may also be fixed by wrapping the assembled pressure resisting layer with an aluminum or like tape 21, as depicted in FIG. 3D.

Since the long segments 20 of each of these pressure resisting layers are of exactly the same configuration, their manufacture can be achieved by the employment of a single kind of die and hence is very simple and economical. Moreover, in the fabrication of such pressure resisting layers, the respective long segments are urged against adjacent ones of them to obtain a required pressure resisting characteristic, so that what is needed in this process is only to rigidly fix the long segments at their relative positions to adjacent ones of them, and no heat is needed for the assembling of the long segments; therefore no adiabatic layer is required and no bad influence is exerted on the transmission characteristic of the optical fiber. Besides, when the cable is mechanically bent or distorted at random, since the long segments have the same configuration, they are equally distorted in a long use and there is no likelihood that only one part of the cable is easily broken. Accordingly, the use of the pressure resisting layer of any of such structures produces a very practical submarine cable which is simple in construction, easy to manufacture and excellent in mechanical strength and does not exert any influence on the optical fiber.

Figure 4:
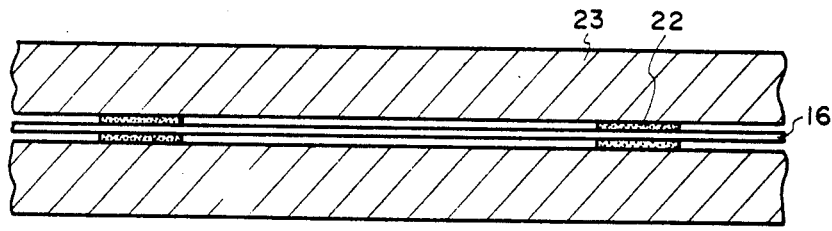
FIG. 4 is a longitudinal sectional view showing the state of a dam provided in the pressure resisting layer for guarding against water according to this invention.
Figure 5:
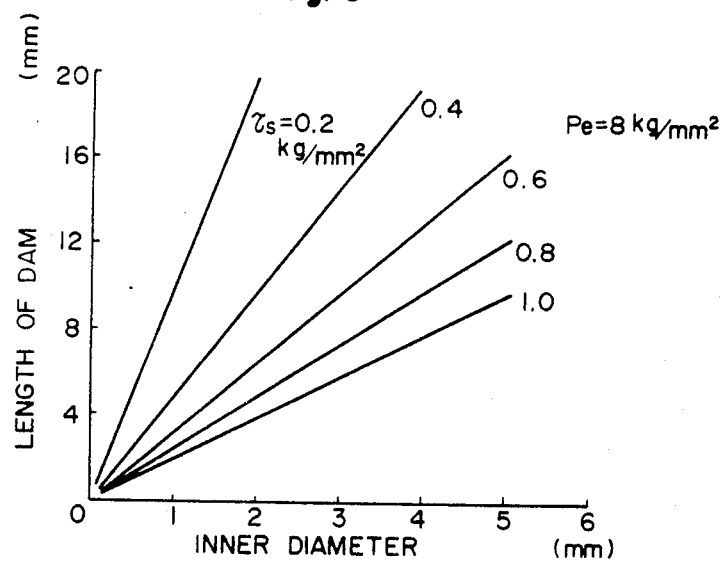
FIG. 5 is a graph showing the relationship between the inner diameter of the pressure resisting layer and a required mimimum length of the dam.

When the submarine cable happens to be broken during or after being laid, sea water enters into the pressure resisting layer, so that one repeater section must be entirely replaced by a new one. To avoid this, this invention can adopt such a construction in which dams for guarding against sea water are provided in the pressure resisting layer at suitable intervals. With this construction, even if the pressure resisting layer is broken by accident, it is sufficient to replace only the dam section broken down. FIG. 4 shows such dams provided in the pressure resisting layer. In the pressure resisting layer 23 the optical fiber core 16 is incorporated and dams 22 are provided as by an adhesive at suitable intervals. Letting Pe represent the water pressure applied to the pressure resisting layer and r the inner diameter of the pressure resisting layer, a required length l of the dam is given by the following equation:

$$l = \frac{r}{4\tau_s} Pe \quad (1)$$

where $\tau_s$ is a shearing force per unit area between the adhesive and the interior surface of the pressure resisting layer. FIG. 5 shows this relation in connection with the case of the cable being laid at a depth of 8000 m. In FIG. 5, the abscissa represents the inner diameter of the pressure resisting layer and the ordinate a required length of the dam. The parameter used is the magnitude of an allowed shearing force, and it is seen that the larger the allowed shearing force is, the shorter the length of the dam may be. The shearing force $\tau_s$ between an ordinary epoxy system adhesive and a metal is in the range of 0.5 to 0.7 kg/mm$^2$, so that when the inner diameter of the pressure resisting layer is 4 mm, the dam length is sufficient to be 20 mm at the longest. Thus, the dam may be very short and hence is very easy to produce. It is also possible to seal a liquid of a suitable viscosity in the pressure resisting layer. This alleviates an external pressure applied to the pressure resisting layer and, at the same time, applies a uniform pressure to the optical fiber to protect it from micro bending and prevent sea water from entering into the pressure resisting layer when the cable is broken.

Figure 6:
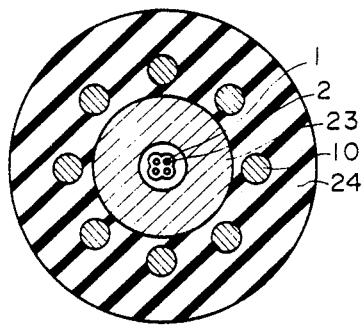
FIGS. 6, 9A and 9B are cross-sectional views illustrating typical embodiments of optical fiber submarine cables of this invention.

In FIG. 6, there is shown a typical example of a long distance submarine cable employing the pressure resisting layer described above. In FIG. 6, reference numeral 1 indicates optical fibers; 2 designates a coating; 23 identifies a pressure resisting layer, which can be used as a feeder, too; 10 denotes tension members for guarding against a tension applied to the cable when it is laid or drawn up; and 24 represents an insulator as of polyethylene or the like.

Let the inner diameter and thickness of the pressure resisting layer 23 be represented by r and t, respectively. When a compression stress Pe is applied to the pressure resisting layer having a yield strength $\lambda_0$, the relationship between a minimum thickness and the yield strength of the pressure resisting layer is given by the following equation:

$$\frac{t}{r} = \sqrt{\frac{\lambda_0}{\lambda_0 - 2kPe}} - 1 \quad (2)$$

where k is a safety factor.

Figure 7:
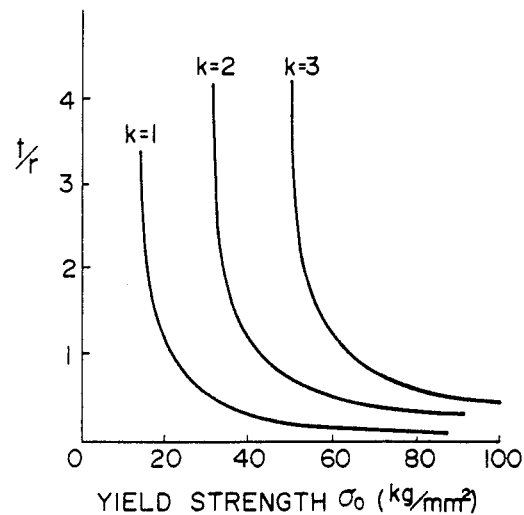
FIG. 7 is a graph showing the relationship between the yield strength and a required minimum thickness of the pressure resisting layer.

In FIG. 7 there are shown the results of the equation (2) when Pe=8 kg/mm$^2$ (corresponding to the compression stress at a depth of 8000 m). In FIG. 7, the abscissa represents the yield strength of the pressure resisting layer and the ordinate the ratio of the minimum thickness t of the pressure resisting layer to the inner diameter r. The parameter used is a safety factor. It is seen from FIG. 7 that when the safety factor 2, a material having a yield strength larger than 40 kg/mm$^2$ is required. The following will describe cable dimensions in a case of using an Al alloy of large tensile strength (corresponding to 2014) as the abovesaid material. The physical properties of this Al alloy are shown in Table 1.

| Specific gravity | Young's modulus | Resistivity | Tensile strength | Yield strength |
|---|---|---|---|---|
| 2.80 g/cm$^2$ | 7400 kg/mm$^2$ | 4.3 × 10 Ω·m | 49.0 kg/mm$^2$ | 42.0 kg/mm$^2$ |

If the tensile strength shown in Table 1 is applied as the yield strength, it follows from FIG. 7 that t/r=0.68. For example, where four optical fibers (if 12,000 circuits, two systems are needed at 400 Mbits/s) are disposed in the pressure resisting layer, the inner diameter of the pressure resisting layer is sufficient to be 4 mm, so that the minimum thickness of the pressure resisting layer is 1.36 mm. If the pressure resisting layer is used as a power feeding-wire, it is seen from the resistivity in Table 1 that in order for the power feeding-wire to have a resistance of 0.52 Ω/km, the power feeding-wire may be 4 mm in inner diameter and 3.6 mm in thickness. This sufficiently satisfies the condition of the pressure resisting layer. Accordingly, by selecting the pressure resisting layer to have an inner diameter of 4 mm and an outer diameter of 11.2 mm, it is possible to achieve the functions of both of the power-feeding wire and the pressure resisting layer.

Figure 8:
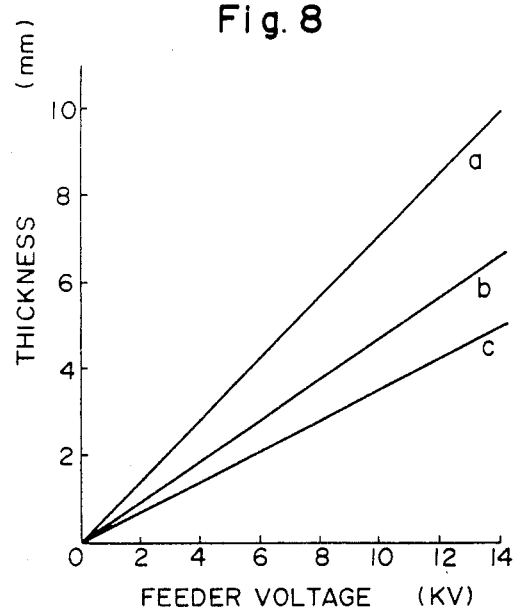
FIG. 8 is a graph showing a required thickness of polyethylene layer relative to a feeder voltage.

Next, in a case of laying a submarine cable on the seabed of 8000 m depth or drawing up the cable, the tension which the tension member should have is the underwater weight of the cable extending from the seabed to a cable ship. The thickness of the cable is dependent upon the thickness of an insulating layer coated on the outside of the pressure resisting layer. FIG. 8 shows the dielectric strength of polyethylene which is used as the insulating layer. In FIG. 8, the abscissa represents a feeding voltage and the ordinate the thickness of the polyethylene. Reference characters a, b and c respectively indicate 1414 Volts/mm, 2121 Volts/mm and 2828 Volts/mm in cases where a corona withstand voltage is minimum, mean and maximum, respectively. Power supply is achieved from both end stations, so that even in a case of polyethylene of a minimum corona withstand voltage, the thickness of the polyethylene necessary for a withstand voltage 8250 Volts is sufficient to be 6 mm. Then, it is seen that the outer diameter of the cable as a whole is about 25 mm. If strands of steel wires are used as the tension members, the underwater weight of the cable can be calculated and a required cross sectional area of each strand can also be known. In a case of such a structure as shown in FIG. 6, a required outer diameter of each strand is 2.54 mm. This strand can be easily obtained by known techniques.

Generally, the cable using such a thick pressure resisting layer is difficult to bend. The allowable bending radius of the cable is dependent upon the outer diameter of the pressure resisting layer, the Young's modulus of the material of the pressure resisting layer and a stress allowable to the pressure resisting layer, and in a case of FIG. 6, if the yield strength in Table 1 is used as an allowable stress, its value is 0.987 m. It is seen that this value satisfies the condition for the cable laying (an allowable bending radius being about 1.5 m).

Figure 9A:
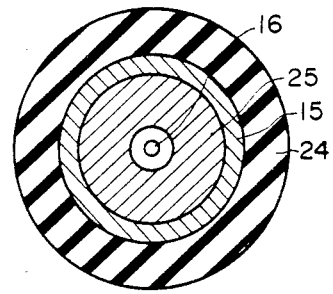
Figure 9B:
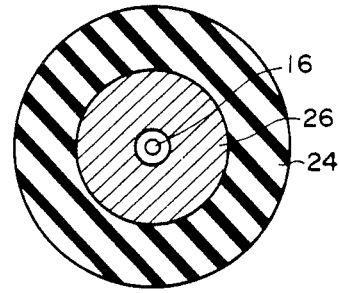

The above is the structure in which the pressure resisting layer is also used as a power-feeding wire, but by making the pressure resisting layer of a material having a large tensile strength, it is also possible to use the pressure resisting layer as a tension member. FIG. 9A illustrates an embodiment of the structure in which the pressure resisting layer further serves as a tension member. In FIG. 9A, reference numeral 16 indicates an optical fiber core; 25 designates a combined pressure resisting layer and tension member; 15 identifies a power-feeding conductor; and 24 denotes an insulating layer. Further, by a suitable selection of a material, it is also possible to adopt such a structure as shown in FIG. 9B in which the pressure resisting layer 26 also performs a combined function as a power feeding conductor and a tension member.

After all, such a structure enables the functions of a pressure resisting layer and a power feeding conductor or a tension member to be achieved by a single layer, and hence permits of simplification of the cable construction. Further, since the optical fiber is at the center of the cable, it is most protected from external forces and need not be wound in a spiral form; therefore the length of the optical fiber used is shorter than those in the cases of the other structures and consequently safe and economical. Besides, by selecting the material used, the allowable bending radius of the cable can satisfy the condition during laying, so that this structure is very practical.

As described above in detail, in a long-distance, deep-sea optical fiber submarine cable, its power-feeding conductor and tension member are thick, so that the cable structure can be simplified by employing the thick pressure resisting layer of this invention in place of a small-diametered pipe heretofore used. The pressure resisting layer segments can be fabricated by using one kind of die and the pressure resisting layer can be produced only by assembling together the long, identical segments, and consequently a thick pressure resisting layer can be obtained very easily. Moreover, since no heating process is involved in the manufacture, no adiabatic layer is needed and no bad influence is exerted on the transmission characteristic of the optical fiber. Further, the long segments are identical in configuration and hence are each subject to an equal mechanical strength; therefore the pressure resisting layer is not likely to be partly broken. In addition, by providing dams in the pressure resisting layer or injecting a viscous material into the layer in preparation for breakage of the submarine cable, sea water can be prevented from entering into the pressure resisting layer and the part to be repaired can be limited: this is very economical. If the viscous material is injected at a suitable pressure, an external pressure can be reduced and the pressure to the optical fiber can be made uniform over its entire length.

In short, by disposing such a pressure resisting layer at the center of the optical fiber submarine cable, an optical fiber submarine cable for the long distance and deep sea use can be obtained, which makes the pressure resisting layer to perform both its own function and the function of a power-feeding conductor or tension member, has a simple construction, permits protection of an optical fiber and reduction of its length, and is excellent in mechanical characteristic.

Referring first to FIGS. 10 to 13, another embodiment of this invention will be described.

FIG. 10 illustrates in section a thin wire 20a of steel or like material, whose diameter is suitably selected so that the wire may sufficiently withstand the water pressure on the seabed (for example, about 800 atm. at a depth of 8000 m) after worked. The following description will be given in connection with a case of the wire being a steel wire. As shown in FIG. 11, a groove 28 is made in the steel wire 20a to extend in parallel with the axis thereof. The depth of the groove 28 is selected so that its bottom may agree with the central axis of the steel wire 20a, as shown, and the bottom of the groove 28 is formed substantially semicircular. Then, as depicted in FIG. 12, one or more coated optical fibers 1, as required, are inserted into the groove 28. The groove 28 is formed wide, enough to permit the optical fibers 1 to move a little in the groove 28. Next, as shown in FIG. 13, a metal wire 30 having such a cross section as indicated by hatching is fitted into the groove 28.

When the cross section of the wire 30 is such as indicated by hatching in FIG. 14, the cross section of the pressure resisting layer can be made circular.

It is also possible to make grooves having such cross sections as shown in FIGS. 15 and 16 and fit metal wires 30 of such cross sections as shown, respectively.

With this invention, it is possible to easily achieve successive fabrication of a pressure resisting layer for an optical fiber by making an optical fiber insertion groove in a long and thin columnar wire of a circular cross section, inserting an optical fiber core or cores into the groove and then fitting or pressing a cover into the groove while drawing the grooved wire.

Further, a spiral groove of a constant cycle may also be made in a columnar pressure resisting layer about the axis thereof. This is intended to prevent that when the pressure resisting layer is used in a cable, the cover fitting into the groove comes off due to bending of the cable.

FIG. 17 shows a structure in which a tape 40 is wound on the pressure resisting layer so as to rigidly engage the cover with the groove. The tape 40 is wrapped around the pressure resisting layer in its lengthwise direction and the joint is welded and then the assembly is subjected to wire drawing, thereby to ensure rigid engagement of the cover with the groove. Moreover, by using aluminum, copper or like material of good conductivity as the tape 40, it is possible to achieve the function of a power-feeding conductor.

Further, it is desirable as shown in FIG. 18 to seal an adhesive 35 as partition members at suitable intervals to fix the optical fibers in the groove 28 and to have such a structure which prevents sea water from entering into the groove in case of breakage of the cable in the sea. By sealing a liquid or jellied material of a proper viscosity in the groove 28, it is also possible to prevent sea water from entering into the groove 28 in case of the cable breakage and alleviate the strength of the pressure resisting layer. The optical fiber 1 is made of glass and is of poor water-resisting qualities; therefore it is effective to fill the liquid or jellied substance in the groove 28 to protect the optical fiber 1.

The steel wire 20a having thus sealed therein the optical fibers withstands a high pressure in the depths of the sea and serves to protect the optical fibers from direct application thereto of the water pressure and prevent a characteristic change which is expected to occur when the optical fibers are submerged in the sea water.

The steel wire 20a has an appreciable tensile strength by itself and the pressure resisting layer can also be used as a tension member. Further, if the pressure resisting layer, that is, one or both of the groove and the cover are made of copper, aluminum or like material of good conductivity, the function of a power-feeding conductor can also be performed.

In FIGS. 19 through 21, there are illustrated embodiments of the optical fiber submarine cables employing the pressure resisting layer described above.

In FIG. 19, reference numeral 50 indicates a pressure resisting layer having incorporated therein optical fibers, the pressure resisting layer 50 being used as both a power-feeding conductor and a tension member; and 60 designates an insulating layer made of polyethylene or like material. The illustrated structure is simple and easy to fabricate and can be expected to achieve an economical optical fiber submarine cable.

In FIG. 20, tension members 70 are disposed around the pressure resisting layer 50, and the layer 50 also functions as a power-feeding conductor. Reference numeral 60 identifies an insulating layer as of polyethylene. In FIGS. 19 and 20, the insulating layer 60 is used as a jacket for protecting the optical fiber submarine cable from external forces.

To protect the optical fiber submarine cable against troubles caused by anchoring and fishing when it is laid in a shallow sea, it is possible to adopt an armoured cable structure shown in FIG. 21, in which the pressure resisting layer 50 having incorporated therein optical fibers is covered with an insulator 60 such as polyethylene or the like and, as armoured wires 70, for example, iron wires covered with vinyl or the like are disposed around the insulator.

This invention facilitates, by a simple manufacturing method, the insertion of optical fibers in a thick pipe which has been difficult in the past, and makes it possible to obtain a highly reliable optical fiber submarine cable for use in the deep sea.

What we claim is:

1. A submarine optical fiber cable using a low-loss optical fiber as a transmission medium comprising a cylindrical pressure-resisting metal layer consisting of an assembly of only three longitudinally extending nonstranded pressure-resisting segments, each of said segments being fan-shaped in cross section and all equal in cross section with entirely flat contact surfaces along which the segments make contact longitudinally and solid throughout, said segments converging toward a center and defining one cylindrical optical fiber housing space centrally of the assembly, and at least one low-loss optical fiber extending longitudinally in the optical fiber housing space formed in the center of the assembly so the low-loss optical fiber is protected from a high hydrostatic water pressure.

2. A submarine optical fiber cable according to claim 1, wherein the pressure resisting segments are assembled by welding or bonding them together into said pressure resisting layer.

3. A submarine optical fiber cable according to claim 1, wherein the pressure resisting segments are assembled together by wrapping a tape around them into said pressure resisting layer.

4. A submarine optical fiber cable according to claim 1, wherein the pressure resisting layer is made of a good conductor of electricity and used for feeding electric power to separators.

5. A submarine optical fiber cable according to claim 1, wherein the pressure resisting layer is made of a material having a large tensile strength and adapted to have the function of a tension member.

6. A submarine optical fiber cable according to claim 1, wherein partition members are provided in the optical fiber housing space at suitable intervals in the lengthwise direction of the pressure resisting layer to prevent movement of a fluid in the space in the lengthwise direction.

7. A submarine optical fiber cable according to claim 6, wherein the partition members are each formed of an adhesive.

8. A submarine optical fiber cable according to claim 6, wherin the optical fiber housing space is filled with a liquid or jellied substance for preventing sea water from entering into the space and increasing the pressure resisting strength of the pressure resisting layer.

* * * * *